(12) United States Patent
Atarashi et al.

(10) Patent No.: US 10,340,767 B2
(45) Date of Patent: Jul. 2, 2019

(54) MOTOR WITH BUSBAR UNIT MOUNTED ON BEARING FLANGE

(71) Applicant: Nidec Corporation, Minami-ku, Kyoto (JP)

(72) Inventors: Takao Atarashi, Kyoto (JP); Yoshiaki Yamashita, Kyoto (JP); Tatsuro Kawamoto, Kyoto (JP); Yusaku Yoshida, Kyoto (JP); Tomoki Iga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 224 days.

(21) Appl. No.: 15/083,626

(22) Filed: Mar. 29, 2016

(65) Prior Publication Data

US 2016/0294248 A1 Oct. 6, 2016

(30) Foreign Application Priority Data

Mar. 31, 2015 (JP) ................................ 2015-074564

(51) Int. Cl.
*H02K 5/16* (2006.01)
*H02K 5/22* (2006.01)
(Continued)

(52) U.S. Cl.
CPC ............. *H02K 5/225* (2013.01); *H02K 3/522* (2013.01); *H02K 5/16* (2013.01); *H02K 5/22* (2013.01);
(Continued)

(58) Field of Classification Search
CPC ........ H02K 11/30; H02K 11/38; H02K 5/225; H02K 2203/09; H02K 5/16; H02K 5/161;
(Continued)

(56) References Cited

U.S. PATENT DOCUMENTS 2,819,933 A * 1/1958 Carrington ............ F16C 23/045
384/204
3,008,777 A * 11/1961 Wightman ........... H02K 5/1672
384/408
(Continued)

FOREIGN PATENT DOCUMENTS

JP  2006094573 A  4/2006
JP  20100187434 A  8/2010
(Continued)

OTHER PUBLICATIONS

Fukunaga et al.,"MOTOR", U.S. Appl. No. 14/760,219, filed Jul. 10, 2015.
(Continued)

*Primary Examiner* — Bernard Rojas
*Assistant Examiner* — Alexander A Singh
(74) *Attorney, Agent, or Firm* — Cantor Colburn LLP

(57) ABSTRACT

A motor may include a rotor including a shaft; a stator arranged radially outside of the rotor; a bearing arranged on an upper side of the stator; a tubular housing; a bearing holder arranged on the upper side of the stator; and a busbar unit arranged on an upper side of the bearing holder. The rotor may include a rotor magnet fixed to the shaft. The stator may include an annular core back; teeth arranged to extend radially inward from the core back; and coils wound around the teeth. The housing may include a housing inner circumferential surface arranged to hold the stator. The bearing holder may be arranged to be in contact with the housing inner circumferential surface. The busbar unit may be arranged to be in contact with the housing inner circumferential surface.

12 Claims, 5 Drawing Sheets

(51) Int. Cl.
*H02K 3/52* (2006.01)
*H02K 7/08* (2006.01)
*H02K 11/215* (2016.01)
*H02K 11/33* (2016.01)

(52) U.S. Cl.
CPC ............. *H02K 5/161* (2013.01); *H02K 7/083* (2013.01); *H02K 11/215* (2016.01); *H02K 11/33* (2016.01)

(58) Field of Classification Search
CPC ........ H02K 5/163; H02K 5/165; H02K 5/167; H02K 5/1672; H02K 5/1675; H02K 1/14; H02K 3/18; H02K 7/083; H02K 11/215; H02K 5/22
USPC .......................................................... 310/71
See application file for complete search history.

(56) References Cited

U.S. PATENT DOCUMENTS

| | | | |
|---|---|---|---|
| 4,806,808 A * | 2/1989 | Grecksch | H02K 29/08 310/67 R |
| 8,384,257 B2 | 2/2013 | Kinugawa et al. | |
| 9,982,922 B2 | 5/2018 | Sakai | |
| 2006/0063403 A1* | 3/2006 | Kataoka | H02K 3/522 439/76.2 |
| 2010/0133935 A1* | 6/2010 | Kinugawa | H02K 3/50 310/89 |
| 2014/0077638 A1* | 3/2014 | Nakai | B62D 5/0406 310/71 |
| 2015/0076943 A1* | 3/2015 | Hamajima | H02K 3/28 310/71 |
| 2015/0357878 A1 | 12/2015 | Fukunaga et al. | |

FOREIGN PATENT DOCUMENTS

| | | |
|---|---|---|
| JP | 2014075866 B1 | 4/2014 |
| JP | 2014138499 A | 7/2014 |
| JP | 2014204559 A | 10/2014 |
| JP | 2015037331 A | 2/2015 |
| KR | 20120021838 A | 3/2012 |
| WO | 2014097560 A1 | 6/2014 |

OTHER PUBLICATIONS

Korean Office Action corresponding to Application No. 2017-122402; dated Apr. 27, 2018.
Korean Notice of Allowance corresponding to Application No. 2015-188165; dated Jan. 25, 2018.

* cited by examiner

MOTOR WITH BUSBAR UNIT MOUNTED ON BEARING FLANGE

CROSS REFERENCE TO RELATED APPLICATION

The present invention claims priority under 35 U.S.C. § 119 to Japanese Application No. 2015-074564 filed Mar. 31, 2015, the entire content of which is incorporated herein by reference.

BACKGROUND OF THE INVENTION

Field of the Invention
The present invention relates to a motor.
Background
Some known motors include a busbar unit. The busbar unit is attached to, for example, a stator core.

Some other known motors include a busbar unit, a bearing holder, and a stator arranged in the order named in an axial direction. In such a motor, the bearing holder is arranged between the busbar unit and the stator. Accordingly, it is impossible to attach the busbar unit to a stator core to position the busbar unit with respect to the stator. Therefore, it is difficult to position the busbar unit with high accuracy with respect to the stator, which may lead to a reduction in accuracy with which the busbar unit is positioned relative to the stator.

SUMMARY

A motor according to an embodiment of the present invention includes a rotor, a stator, a bearing, a housing, a bearing holder, and a busbar unit. The rotor includes a shaft having a central axis extending in a vertical direction as a center thereof. The stator is arranged radially outside of the rotor. The bearing is arranged on an upper side of the stator to rotatably support the shaft. The housing is tubular and is arranged to hold the stator. The bearing holder is arranged on the upper side of the stator to hold the bearing. The busbar unit is arranged on an upper side of the bearing holder to supply an electric drive current to the stator. The rotor includes a rotor magnet directly or indirectly fixed to the shaft. The stator includes an annular core back, teeth, and coils. The teeth are arranged to extend radially inward from the core back. The coils are wound around the teeth. The housing includes a housing inner circumferential surface arranged to hold the stator. The bearing holder is arranged to be in contact with the housing inner circumferential surface. The busbar unit is arranged to be in contact with the housing inner circumferential surface.

The above and other elements, features, steps, characteristics and advantages of the present invention will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EMBODIMENTS

Hereinafter, motors according to embodiments of the present invention will be described with reference to the accompanying drawings. Note that the scope of the present invention is not limited to the embodiments described below, but includes any modification thereof within the scope of the technical idea of the present invention. Also note that scales, numbers, and so on of members or portions illustrated in the accompanying drawings may differ from those of actual members or portions, for the sake of easier understanding of the members or portions.

In the accompanying drawings, an xyz coordinate system is shown appropriately as a three-dimensional orthogonal coordinate system. In the xyz coordinate system, a z-axis direction is assumed to be a direction parallel to a central axis J shown in FIG. 1. An x-axis direction is assumed to be a direction perpendicular to the z-axis direction, and is assumed to be a horizontal direction in FIG. 1. A y-axis direction is assumed to be a direction perpendicular to both the x-axis direction and the z-axis direction.

It is assumed in the following description that a direction in which the central axis J extends (that is, the z-axis direction) is a vertical direction. A positive side (i.e., a +z side) in the z-axis direction will be referred to as an upper side, while a negative side (i.e., a −z side) in the z-axis direction will be referred to as a lower side. It should be noted, however, that the above definitions of the vertical direction and the upper and lower sides are made simply for the sake of convenience in description, and are not meant to restrict actual relative positions or directions of different members or portions. In addition, unless otherwise specified, the direction parallel to the central axis J (i.e., the z-axis direction) will be simply referred to by the term "axial direction", "axial", or "axially", radial directions centered on the central axis J will be simply referred to by the term "radial direction", "radial", or "radially", and a circumferential direction about the central axis J (i.e., a $\theta_z$ direction) will be simply referred to by the term "circumferential direction", "circumferential", or "circumferentially".

It is assumed that the wording "to extend in an axial direction", "to extend axially", or the like as used in the following description includes not only to extend exactly in the axial direction but also to extend in a direction at an angle of less than 45 degrees to the axial direction. It is also assumed that the wording "to extend in a radial direction", "to extend radially", or the like as used in the following description includes not only to extend exactly in a radial direction or exactly radially, that is, exactly in a direction or directions perpendicular to the axial direction, but also to extend in a direction or directions at an angle of less than 45 degrees to the radial direction(s).

Figure 1:
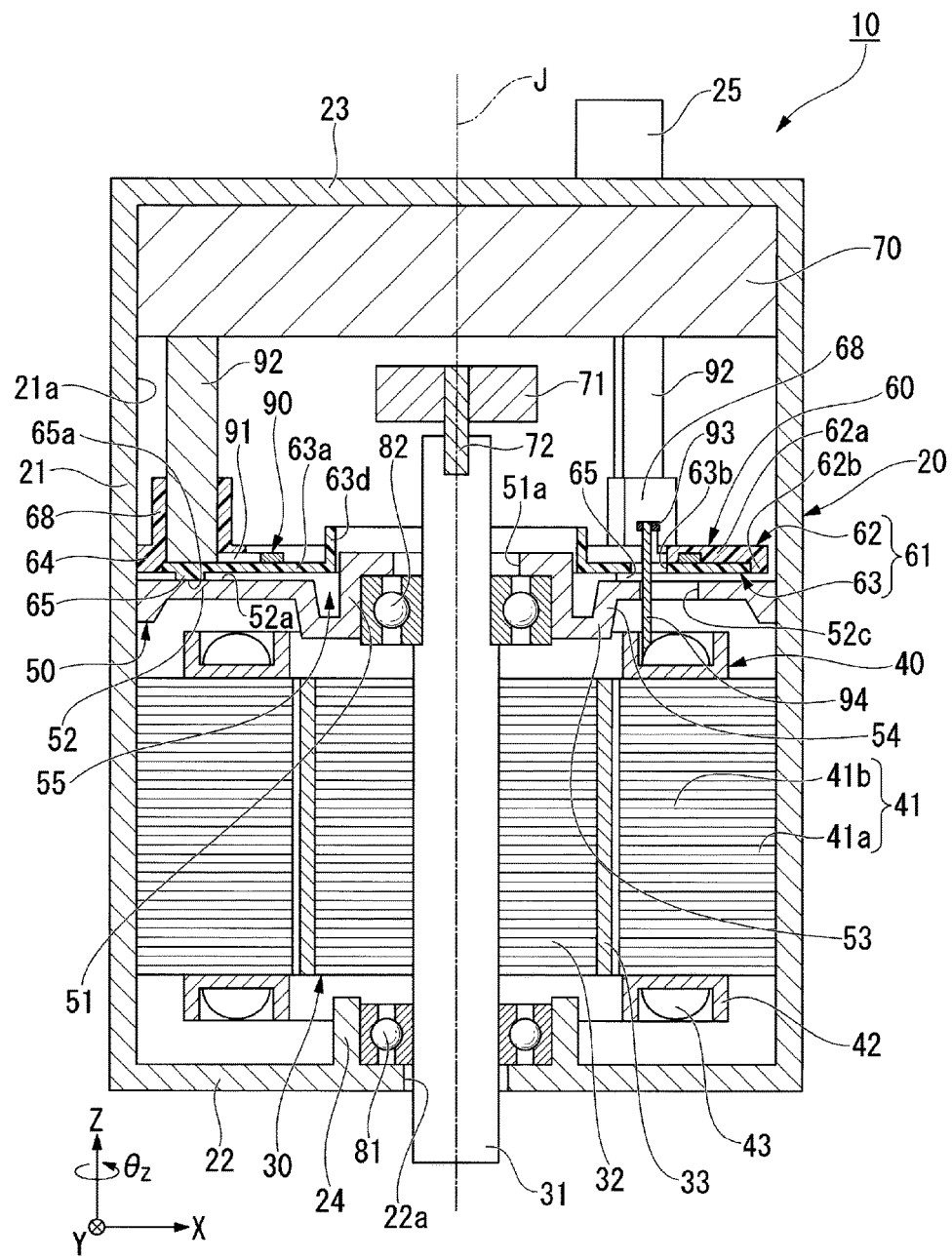
FIG. 1 is a cross-sectional view of a motor according to an embodiment of the present invention.
Figure 2:
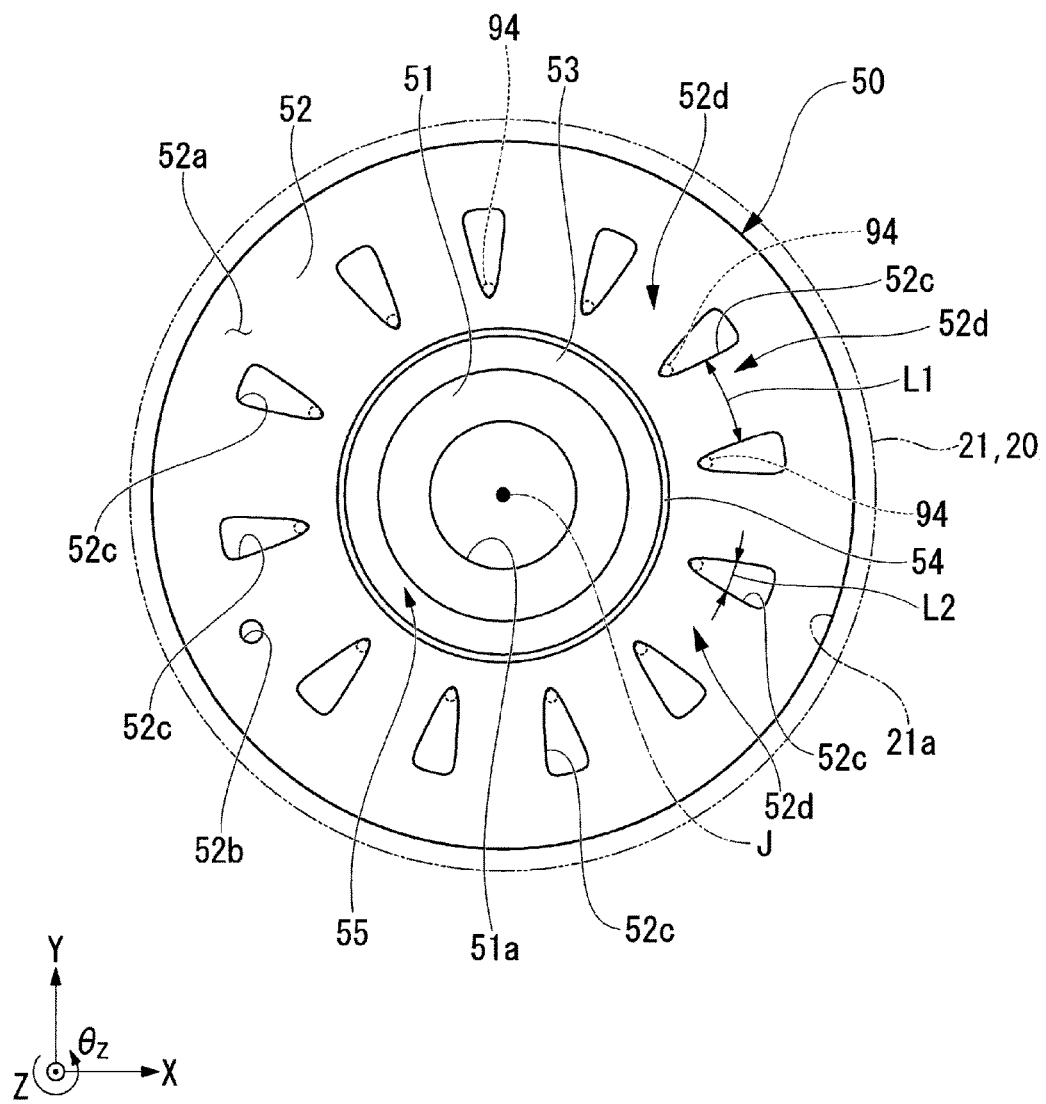
FIG. 2 is a plan view of a bearing holder according to an embodiment of the present invention.
Figure 3:
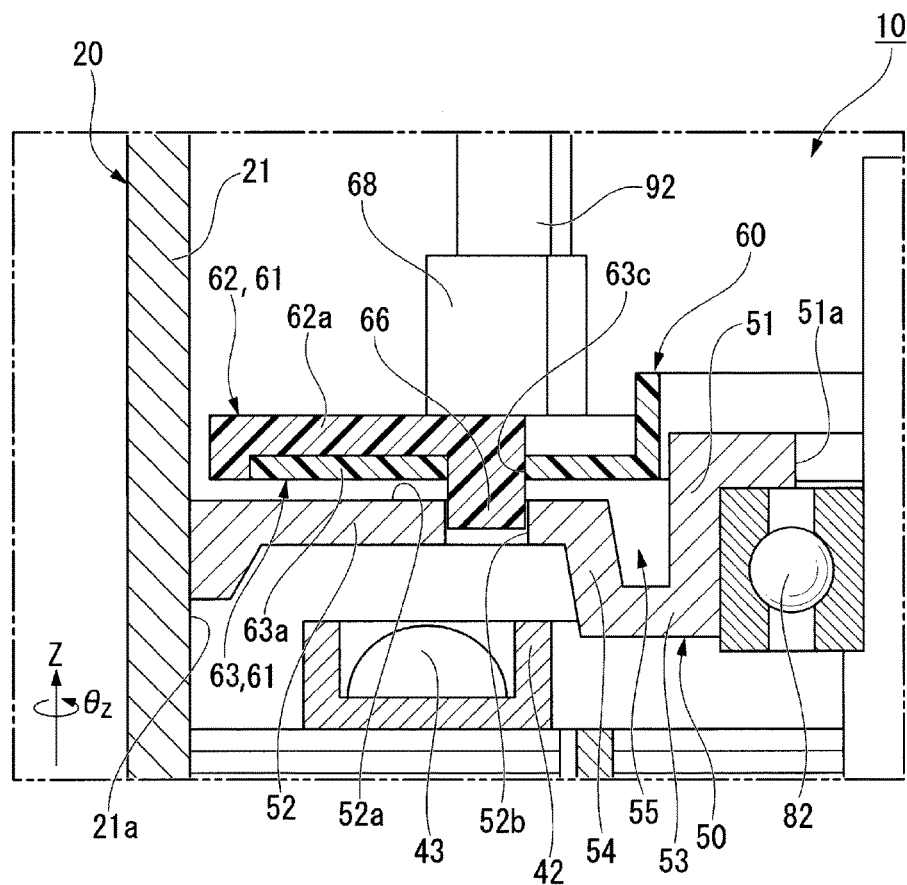
FIG. 3 is a cross-sectional view of a portion of the motor according to an embodiment of the present invention.
Figure 4:
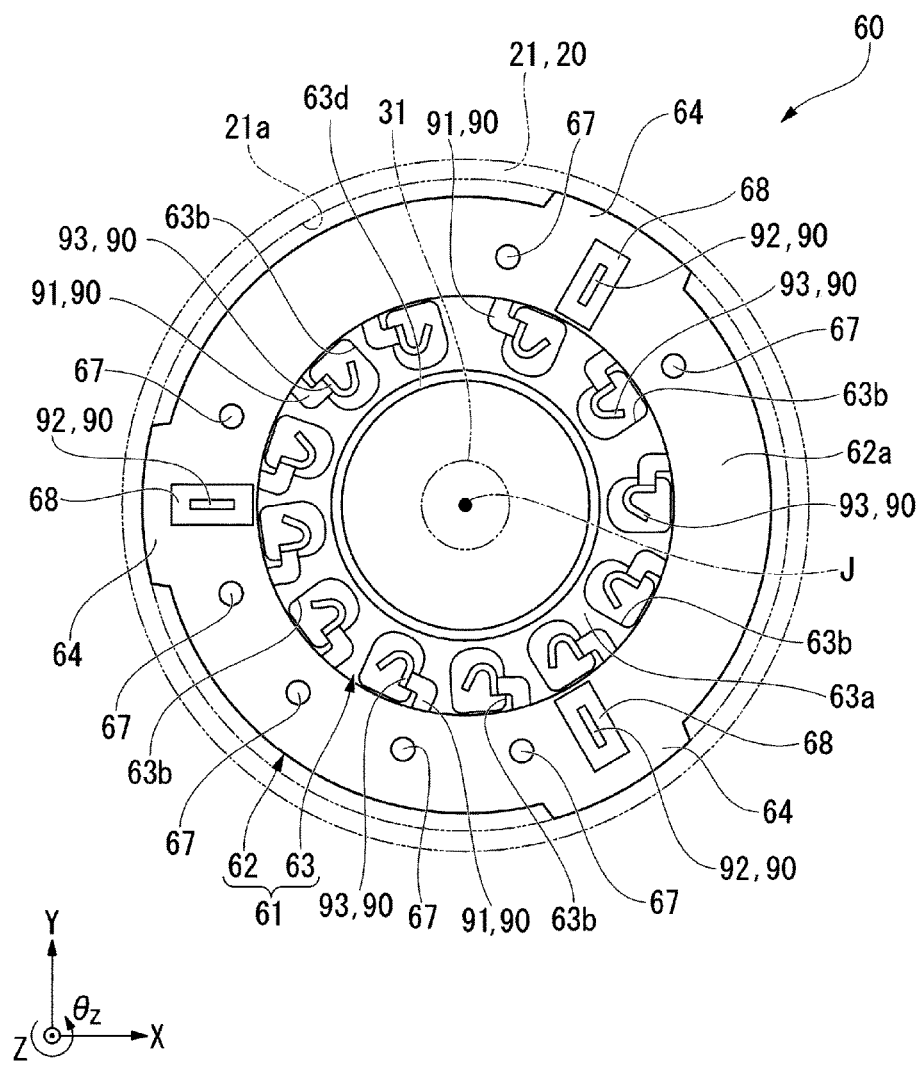
FIG. 4 is a plan view of a busbar unit according to an embodiment of the present invention.
Figure 5:
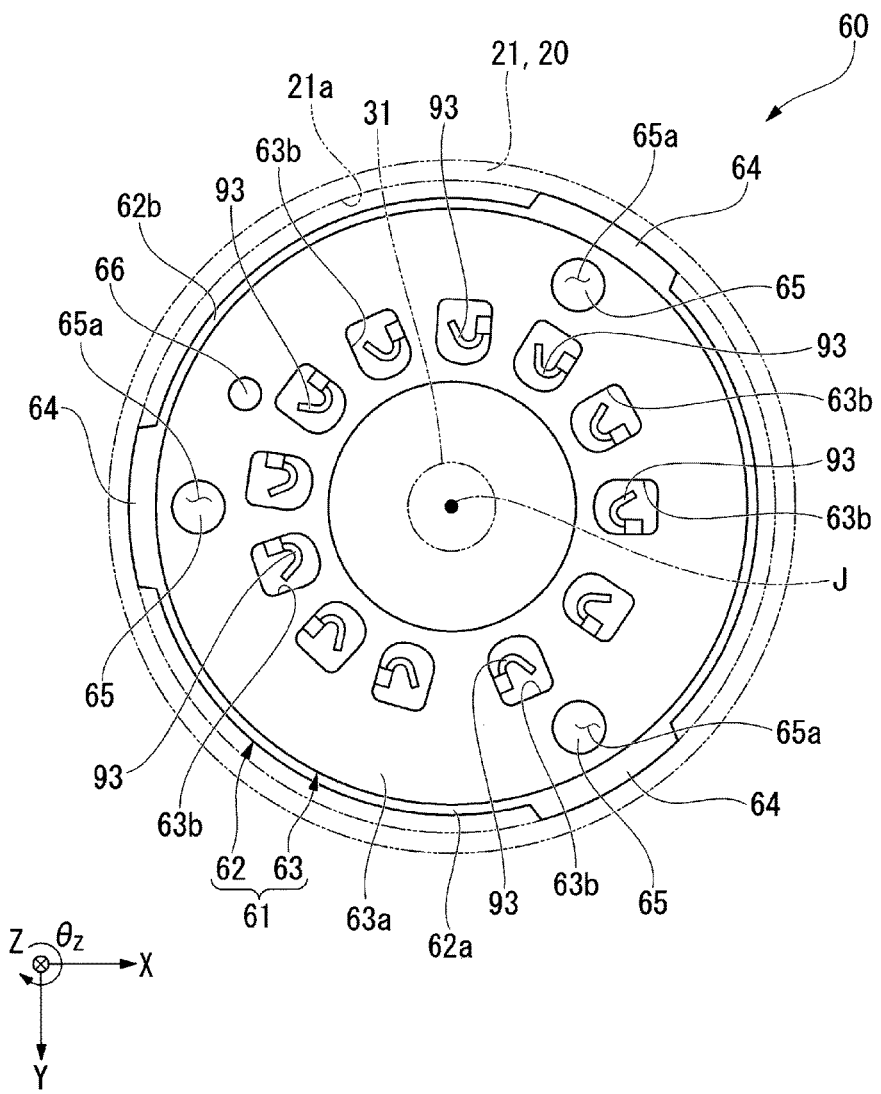
FIG. 5 is a bottom view of the busbar unit according to an embodiment of the present invention.

FIG. 1 is a cross-sectional view of a motor 10 according to an embodiment of the present invention. FIG. 2 is a plan view of an upper bearing holder 50 of the motor 10. FIG. 3 is a cross-sectional view of a portion of the motor 10. FIG. 4 is a plan view of a busbar unit 60 of the motor 10. FIG. 5 is a bottom view of the busbar unit 60. Note that the term "plan view" as used herein refers to a view of a given target object as viewed from above. Also note that the term "bottom view" as used herein refers to a view of a given target object as viewed from below.

Referring to FIG. 1, the motor 10 includes a housing 20, a connector portion 25, a rotor 30, a sensor magnet 71, a stator 40, the upper bearing holder 50, bearings, the busbar unit 60, and a control unit 70. The bearings include a lower bearing 81 and an upper bearing 82. In the motor 10, the busbar unit 60, the upper bearing holder 50, and the stator 40 are arranged in the order named with the busbar unit 60 at the top and the stator 40 at the bottom.

The housing 20 is arranged to accommodate the rotor 30, the sensor magnet 71, the stator 40, the upper bearing holder 50, the lower bearing 81, the upper bearing 82, the busbar unit 60, and the control unit 70. The housing 20 is tubular, and is arranged to hold the stator 40. In this embodiment, the housing 20 is made of a metal. The housing 20 includes a housing tubular portion 21, a housing bottom plate portion 22, a lower bearing holding portion 24, and a housing top plate portion 23.

The housing tubular portion 21 is tubular, and is arranged to extend in a circumferential direction to surround the stator 40. In this embodiment, the housing tubular portion 21 is cylindrical or substantially cylindrical, and is centered on the central axis J. A housing inner circumferential surface 21a is an inner circumferential surface of the housing tubular portion 21. The stator 40 is held by the housing inner circumferential surface 21a. That is, the housing 20 includes the housing inner circumferential surface 21a arranged to hold the stator 40. The housing inner circumferential surface 21a is an inner circumferential surface of the housing 20 as well.

The housing bottom plate portion 22 is joined to a lower end portion of the housing tubular portion 21. The housing bottom plate portion 22 is arranged to cover a lower side of the stator 40. The housing bottom plate portion 22 includes an output shaft hole 22a arranged to pass through the housing bottom plate portion 22 in the axial direction. The output shaft hole 22a is defined in a center of the housing bottom plate portion 22.

The lower bearing holding portion 24 is tubular, and is arranged to project upward from the housing bottom plate portion 22. The lower bearing holding portion 24 is arranged radially outward of the output shaft hole 22a. The lower bearing 81 is held by a radial inside of the lower bearing holding portion 24. The housing top plate portion 23 is joined to an upper end portion of the housing tubular portion 21. The housing top plate portion 23 is arranged to cover an upper side of the control unit 70.

The connector portion 25 is arranged to project upward from the housing top plate portion 23. The connector portion 25 includes a recessed portion (not shown) which opens upward. A terminal of the control unit 70 is exposed inside of the recessed portion of the connector portion 25. An external power supply (not shown) is connected to the connector portion 25.

The rotor 30 includes a shaft 31, a rotor core 32, and a rotor magnet 33. The shaft 31 has the central axis J, which extends in the vertical direction, as a center thereof. A lower end portion of the shaft 31 is arranged to project out of the housing 20 through the output shaft hole 22a.

The rotor core 32 is fixed to an outer circumferential surface of the shaft 31. The rotor magnet 33 is fixed to an outer circumferential surface of the rotor core 32. That is, the rotor magnet 33 is indirectly fixed to the shaft 31. The shaft 31, the rotor core 32, and the rotor magnet 33 are arranged to rotate about the central axis J (i.e., in a $\pm\theta_z$ direction) together.

The sensor magnet 71 is attached to an upper end portion of the shaft 31. In this embodiment, the sensor magnet 71 is in the shape of an annular ring. An attachment member 72 is fixed to the upper end portion of the shaft 31. The sensor magnet 71 is fitted to an outer circumference of the attachment member 72.

The lower and upper bearings 81 and 82 are arranged to support the shaft 31. The lower and upper bearings 81 and 82 are arranged to support the shaft 31 such that the shaft 31 is rotatable about the central axis J (i.e., in the $\pm\theta_z$ direction). The lower bearing 81 is arranged on a lower side of the stator 40. The lower bearing holding portion 24 is arranged to hold the lower bearing 81. The upper bearing 82 is arranged on an upper side of the stator 40. The upper bearing holder 50 is arranged to hold the upper bearing 82.

The stator 40 is arranged radially outside of the rotor 30. In more detail, the stator 40 is arranged radially outside of the rotor 30 to surround the rotor 30. The stator 40 includes a stator core 41, an insulator 42, and coils 43. The stator core 41 includes a core back 41a and a plurality of teeth 41b. The core back 41a is annular. In this embodiment, the core back 41a is cylindrical or substantially cylindrical, and is centered on the central axis J. An outside surface of the core back 41a is fixed to the housing inner circumferential surface 21a. The stator 40 is thus held by the housing inner circumferential surface 21a.

Although not shown in the figures, the stator core 41 includes the plurality of teeth 41b. The teeth 41b are arranged to extend radially inward from the core back 41a. The teeth 41b are arranged at regular intervals in the circumferential direction. The insulator 42 is attached to the teeth 41b. The insulator 42 includes an inner wall arranged to extend in the axial direction at a radially inner end of the insulator 42, and an outer wall arranged to extend in the axial direction at a radially outer end of the insulator 42. Each coil 43 is wound around a corresponding one of the teeth 41b with a portion of the insulator 42 intervening therebetween. Each coil 43 is arranged radially between the inner wall of the insulator 42 at the radially inner end thereof and the outer wall of the insulator 42 at the radially outer end thereof. The inner and outer walls of the insulator 42 serve to prevent each coil 43 from moving radially to come off the insulator 42.

The upper bearing holder 50 is arranged on the upper side of the stator 40. The upper bearing holder 50 is arranged to hold the upper bearing 82. The upper bearing holder 50 is arranged to be in contact with the housing inner circumferential surface 21a. In this embodiment, the upper bearing holder 50 is fixed to the housing inner circumferential surface 21a. The upper bearing holder 50 is fixed to the housing inner circumferential surface 21a through, for example, shrink fitting.

Referring to FIGS. 1 and 2, the upper bearing holder 50 includes a holding portion 51, an annular portion 52, a bottom portion 53, a joining portion 54, and a buffer portion 55. The holding portion 51 is tubular. An inner circumferential surface of the holding portion 51 is arranged to hold the upper bearing 82. In this embodiment, the holding portion 51 is in the shape of a cylinder or substantially cylinder having a cover with the central axis J as a center. The holding portion 51 includes a cover through hole 51a arranged to pass through a cover portion of the holding portion 51 in the axial direction. The upper end portion of the shaft 31 is arranged to project upward above the upper bearing holder 50 through the cover through hole 51a.

The annular portion 52 is arranged radially outside of the holding portion 51. Referring to FIG. 2, the annular portion 52 is in the shape of an annular ring, and is arranged to extend in the circumferential direction to surround the holding portion 51. In this embodiment, the annular portion 52 is in the shape of an annular ring, and is centered on the central axis J. A radially outer end portion of the annular portion 52 is fixed to the housing inner circumferential surface 21a. Referring to FIG. 1, the annular portion 52 is arranged at a level higher than that of a lower end portion of the holding portion 51. The annular portion 52 is arranged at a level lower than that of an upper end portion of the holding portion 51. A lower surface of the annular portion 52 is arranged at a level higher than that of an upper surface of the bottom portion 53.

Referring to FIG. 2, the annular portion 52 includes a plurality of holder through holes 52c and a plurality of intermediate portions 52d. That is, the upper bearing holder 50 includes the plurality of holder through holes 52c and the plurality of intermediate portions 52d. The holder through holes 52c are arranged along the circumferential direction. Referring to FIG. 1, each holder through hole 52c is arranged to pass through the upper bearing holder 50 in the axial direction. In more detail, each holder through hole 52c is arranged to pass through the annular portion 52 in the axial direction.

Referring to FIG. 2, each holder through hole 52c is arranged to extend in a radial direction. A through hole dimension L2 is defined as a circumferential dimension of the holder through hole 52c. The through hole dimension L2 is greater at a radially outer end portion of the holder through hole 52c than at a radially inner end portion of the holder through hole 52c. The through hole dimension L2 is smallest at the radially inner end portion of the holder through hole 52c. The through hole dimension L2 is arranged to increase in a radially outward direction. An external shape of the holder through hole 52c is substantially triangular in a plan view. Note that the external shape of the holder through hole 52c may alternatively be a shape other than a triangle.

Referring to FIG. 1, each holder through hole 52c is a hole arranged to have a coil wire 94, which is arranged to electrically connect a corresponding one of the coils 43 to the busbar unit 60, pass therethrough. The coil wire 94 may be either an end portion of a winding which defines the coil 43 or a member separate from the winding which defines the coil 43.

Referring to FIG. 2, the coil wire 94 is arranged to pass through the radially inner end portion of the holder through hole 52c. At the radially inner end portion of the holder through hole 52c, the through hole dimension L2 is arranged to have a minimum value that allows the passing of the coil wire 94.

Note that the radially inner end portion of the holder through hole 52c is not limited to a radially innermost end of the holder through hole 52c. The radially inner end portion of the holder through hole 52c includes a vicinity of the radially innermost end of the holder through hole 52c as well. The vicinity of the radially innermost end of the holder through hole 52c covers, for example, an area extending from the radially innermost end of the holder through hole 52c radially outward by about a thickness of the coil wire 94.

Each intermediate portion 52d is a portion extending circumferentially between circumferentially adjacent ones of the holder through holes 52c. An intermediate portion dimension L1 is defined as a circumferential dimension of the intermediate portion 52d. The intermediate portion dimension L1 is smallest at a radially inner end portion of the intermediate portion 52d.

Note that the radially inner end portion of the intermediate portion 52d includes a portion extending between the radially inner end portions of the circumferentially adjacent ones of the holder through holes 52c. That is, the radially inner end portion of the intermediate portion 52d is not limited to a radially innermost end of the intermediate portion 52d. The radially inner end portion of the intermediate portion 52d includes a vicinity of the radially innermost end of the intermediate portion 52d as well. The vicinity of the radially innermost end of the intermediate portion 52d covers, for example, an area extending from the radially innermost end of the intermediate portion 52d radially outward by about the thickness of the coil wire 94.

Here, the rigidity of the upper bearing holder 50 increases as the size of each holder through hole 52c (more specifically, the area of each holder through hole 52c in a plan view) decreases. Meanwhile, an increase in the size of the holder through hole 52c (more specifically, the area of the holder through hole 52c in the plan view) makes it easier for an operator or the like to pass the coil wire 94 through the holder through hole 52c when assembling the motor 10.

The rigidity of the upper bearing holder 50 increases as the rigidity of each intermediate portion 52d increases, and decreases as the rigidity of each intermediate portion 52d decreases. The rigidity of the intermediate portion 52d is determined by a minimum value of the intermediate portion dimension L1. In other words, the rigidity of the intermediate portion 52d increases as the minimum value of the intermediate portion dimension L1 increases, and decreases as the minimum value of the intermediate portion dimension L1 decreases. Therefore, the rigidity of the upper bearing holder 50 increases as the minimum value of the intermediate portion dimension L1 increases.

As mentioned above, each holder through hole 52c is a hole arranged to have the coil wire 94 pass therethrough. Accordingly, at a radial position at which each coil wire 94 passes, a maximum circumferential distance between circumferentially adjacent ones of the holder through holes 52c corresponds to a circumferential distance between circumferentially adjacent ones of the coil wires 94. That is, a minimum value of the intermediate portion dimension L1 corresponds to the circumferential distance between the circumferentially adjacent ones of the coil wires 94. In this case, at the radial position at which each coil wire 94 passes, the through hole dimension L2 has the minimum value that allows the passing of the coil wire 94.

Accordingly, at the radial position at which each coil wire 94 passes, the intermediate portion dimension L1 is equal to or smaller than the circumferential distance between the circumferentially adjacent ones of the coil wires 94. Thus, when the intermediate portion dimension L1 has the smallest value at the radial position at which each coil wire 94 passes, the rigidity of the intermediate portion 52d can be maximized. In this case, the rigidity of the upper bearing holder 50 including the holder through holes 52c can be maximized.

When the through hole dimension L2 is arranged to have a value greater than the minimum value that allows the passing of the coil wire 94 at radial positions other than the radial position at which each coil wire 94 passes, it is possible to minimize the intermediate portion dimension L1 at the radial position at which each coil wire 94 passes while allowing each holder through hole 52c to have a sufficiently large size. However, if the coil wire 94 were arranged to pass through the radially outer end portion of the holder through hole 52c, it would be difficult to allow the holder through hole 52c to have a sufficiently large size.

When the through hole dimension L2 is arranged to have the minimum value that allows the passing of the coil wire 94, the minimum value of the intermediate portion dimension L1 can be maximized. If the through hole dimension L2 were arranged to have the minimum value that allows the passing of the coil wire 94 at the radially outer end portion of the holder through hole 52c, and the through hole dimension L2 were increased radially inside of the radially outer end portion of the holder through hole 52c, the intermediate portion dimension L1 would have a value smaller than the value of the intermediate portion dimension L1 at the radial position at which the coil wire 94 passes.

The rigidity of the intermediate portion 52d is reduced when the through hole dimension L2 is arranged to have a greater value radially inside of the radially outer end portion of the holder through hole 52c than at the radially outer end portion of the holder through hole 52c. This makes it difficult to increase the size of the holder through hole 52c while maintaining the rigidity of the upper bearing holder 50 at a high level. Meanwhile, if the through hole dimension L2 is arranged to have, radially inside of the radially outer end portion of the holder through hole 52c, a value equal to or smaller than the value of the through hole dimension L2 at the radially outer end portion of the holder through hole 52c, the rigidity of the upper bearing holder 50 can be maintained at a high level, but the holder through hole 52c will become so small as to make it difficult for the operator or the like to pass the coil wire 94 through the holder through hole 52c when assembling the motor 10.

However, according to this embodiment, the intermediate portion dimension L1 is arranged to have the minimum value at the radially inner end portion of the intermediate portion 52d. Accordingly, the through hole dimension L2 is arranged to have the minimum value that allows the passing of the coil wire 94 at the radially inner end portion of the holder through hole 52c. This maximizes the rigidity of the intermediate portion 52d. This in turn increases the rigidity of the upper bearing holder 50.

In addition, the radially inner end portion of the holder through hole 52c is at the radial position at which the coil wire 94 passes. Therefore, it is difficult to make the value of the intermediate portion dimension L1 radially outside of the radially inner end portion of the intermediate portion 52d smaller than the value of the intermediate portion dimension L1 at the radially inner end portion of the intermediate portion 52d, even when the through hole dimension L2 is increased radially outside of the radially inner end portion of the holder through hole 52c. Therefore, it is possible to increase the size of the holder through hole 52c to such an extent that the operator or the like can easily pass the coil wire 94 through the holder through hole 52c, while maintaining the rigidity of the upper bearing holder 50 at a high level.

The above-described structure makes it possible to increase the area of each holder through hole 52c. This reduces the amount of a material of the upper bearing holder 50 used when the upper bearing holder 50 is molded by casting. This in turn reduces a cost of manufacture of the upper bearing holder 501.

As described above, the upper bearing holder 50 is fixed to the housing inner circumferential surface 21a. Accordingly, if an external force is exerted on the housing 20, the external force applies a stress to the upper bearing holder 50. Insufficient rigidity of the upper bearing holder 50 might permit the external force to deform the upper bearing holder 50.

However, the upper bearing holder 50 has high rigidity as described above. Therefore, application of a great external force would not easily deform the upper bearing holder 50. Moreover, since a deformation of the upper bearing holder 50 does not easily occur, a deformation of the housing inner circumferential surface 21a, to which the upper bearing holder 50 is fixed, does not easily occur, either.

The intermediate portion dimension L1 is arranged to be substantially uniform throughout the entire radial extent of the intermediate portion 52d. Accordingly, even if a stress is exerted on the upper bearing holder 50 in a radial direction, this stress will be evenly distributed in the circumferential direction in the upper bearing holder 50. This further reduces the likelihood of a deformation of the upper bearing holder 50.

The through hole dimension L2 is greater at the radially outer end portion of the holder through hole 52c than at the radially inner end portion of the holder through hole 52c, and is smallest at the radially inner end portion of holder through hole 52c. This allows the intermediate portion dimension L1 to be substantially uniform throughout the entire radial extent of the intermediate portion 52d.

Note that each of the intermediate portion dimension L1 and the through hole dimension L2 may be arranged to be uniform throughout the entire radial extent of the intermediate portion 52d or the holder through hole 52c.

Also note that the radial position at which the coil wire 94 passes may be displaced from the radially inner end portion of the holder through hole 52c. In FIG. 2, the coil wire 94 passes through the radially inner end portion of the holder through hole 52c. However, the coil wire 94 may alternatively be arranged to pass through another portion of the holder through hole 52c. For example, the coil wire 94 may be arranged to pass through a portion of the holder through hole 52c which is radially outward of the radially inner end portion of the holder through hole 52c (see FIG. 2).

An annular portion upper surface 52a is an upper surface of the annular portion 52. Referring to FIGS. 2 and 3, the annular portion upper surface 52a includes a fitting hole portion 52b. The annular portion upper surface 52a is a portion of an upper surface of the upper bearing holder 50. That is, the upper surface of the upper bearing holder 50 includes the fitting hole portion 52b. Referring to FIG. 3, the fitting hole portion 52b is arranged to pass through the upper bearing holder 50 in the axial direction. Referring to FIG. 2, the external shape of the fitting hole portion 52b is circular in a plan view. A fitting projecting portion 66, which will be described below, is fitted into the fitting hole portion 52b.

Referring to FIG. 3, the bottom portion 53 is arranged to extend radially outward from the lower end portion of the holding portion 51. The bottom portion 53 defines a bottom portion of the buffer portion 55. The joining portion 54 is arranged to join a radially outer end portion of the bottom portion 53 and a radially inner end portion of the annular portion 52 to each other. A lower end portion of the joining portion 54 is joined to the radially outer end portion of the bottom portion 53. An upper end portion of the joining portion 54 is joined to the radially inner end portion of the annular portion 52. The joining portion 54 is arranged to extend in a direction angled radially outward with increasing height with respect to the axial direction.

Each of the lower end portion of the holding portion 51, a lower end portion of the bottom portion 53, and the lower end portion of the joining portion 54 is arranged at a level lower than that of an upper end portion of the insulator 42, and is arranged radially inside of the insulator 42. The upper end portion of the insulator 42 is an upper end portion of each of the aforementioned inner and outer walls of the insulator 42. Thus, a portion of the upper bearing holder 50 can be arranged to radially overlap with the insulator 42. In other words, a portion of the upper bearing holder 50 can be arranged to radially overlap with the stator 40. This makes it possible to reduce the size of the motor 10 with an efficient use of a space radially inside of the insulator 42.

The buffer portion 55 is a portion arranged to absorb a stress exerted on the upper bearing 82. The buffer portion 55 is arranged radially between the holding portion 51 and the annular portion 52. The buffer portion 55 is arranged to extend in the circumferential direction to surround the upper bearing 82. Referring to FIG. 2, the buffer portion 55 is in the shape of an annular ring, and is centered on the central axis J.

Referring to FIGS. 1 and 3, the buffer portion 55 is a groove recessed in the axial direction. The buffer portion 55 is a groove which opens upward and is recessed downward. The buffer portion 55 is defined by being surrounded by the holding portion 51, the annular portion 52, the bottom portion 53, and the joining portion 54.

As described above, the upper bearing holder 50 is fixed to the housing inner circumferential surface 21a. Accordingly, if an external force is exerted on the housing 20, the external force will be applied to the upper bearing holder 50 as well. The stress applied to the upper bearing holder 50 may be transferred to the upper bearing 82 to increase a load exerted on the upper bearing 82.

However, as described above, the upper bearing holder 50 includes the buffer portion 55. The buffer portion 55 serves as a buffer to hinder the transfer of the stress from the upper bearing holder 50 to the upper bearing 82. This contributes to reducing a load exerted on the upper bearing 82 when an external force is applied to the housing 20.

In more detail, the annular portion 52 is fixed to the housing inner circumferential surface 21a. If an external force is exerted on the housing tubular portion 21 from the radially outer side, a stress acting in a radially inward direction is applied to the annular portion 52. The stress applied to the annular portion 52 applies a stress acting in the radially inward direction to the upper end portion of the joining portion 54. This stress causes an elastic deformation of the joining portion 54. More specifically, the stress applied to the joining portion 54 causes the joining portion 54 to pivot toward the buffer portion 55, i.e., radially inward, on the lower end portion of the joining portion 54. This elastic deformation of the joining portion 54 reduces or prevents the transfer of the stress applied to the annular portion 52 to the upper bearing 82.

As described above, the buffer portion 55 is a groove. Accordingly, the buffer portion 55 can be easily defined in the upper bearing holder 50 by altering the shape of at least a portion of the upper bearing holder 50. This eliminates a need to provide the buffer portion 55 as a member separate from the upper bearing holder 50, eliminating a need to increase the number of parts of the motor 10.

The radial dimension of the buffer portion 55 is arranged to increase with increasing height. This makes it easy to remove a mold when the upper bearing holder 50 is molded by casting.

Referring to FIG. 1, the busbar unit 60 is arranged on the upper side of the upper bearing holder 50. The busbar unit 60 is arranged to supply an electric drive current from the external power supply (not shown) to the stator 40. Referring to FIGS. 4 and 5, the busbar unit 60 is arranged to be in contact with the housing inner circumferential surface 21a.

The busbar unit 60 can thus be positioned with respect to the housing inner circumferential surface 21a. The housing inner circumferential surface 21a is arranged to hold the stator 40. Thus, the busbar unit 60 and the stator 40 can be positioned with respect to the inner circumferential surface of the same member. In other words, both the busbar unit 60 and the stator 40 can be positioned with respect to the housing inner circumferential surface 21a. Both the busbar unit 60 and the stator 40 are fixed to the housing inner circumferential surface 21a with high positional accuracy. Thus, the radial position of the busbar unit 60 relative to the stator 40 can be determined with high accuracy. This makes it easy to electrically connect the busbar unit 60 to the stator 40.

The housing 20 is made of the metal. Therefore, the housing inner circumferential surface 21a can be accurately defined by machine work or the like. This makes it possible to radially position the busbar unit 60 with respect to the stator 40 with higher accuracy.

The busbar unit 60 includes a busbar holder 61 and busbars 90. The busbar holder 61 is arranged to hold the busbars 90. Each busbar 90 is electrically connected to the stator 40. Each busbar 90 includes a busbar body portion 91, a busbar terminal portion 92, and coil connection portions 93.

Each busbar body portion 91 is arranged to extend in a plane (i.e., an xy-plane) perpendicular to the axial direction. The entire busbar body portion 91 is arranged on the same plane perpendicular to the axial direction. This leads to a reduction in the axial dimension of the busbar unit 60. This in turn leads to a reduction in the axial dimension of the motor 10.

When the entire busbar body portion 91 is arranged on the same plane, an area in which the busbar 90 is arranged may increase in radial extent. This being the case, in this embodiment, the busbar unit 60 is arranged on the upper side of the upper bearing holder 50. This allows an increase in the radial extent of the area in which the busbar 90 is arranged. This allows the entire busbar body portion 91 to be arranged on the same plane, which leads to a reduction in the axial dimension of the motor 10.

The busbars 90 include a plurality of busbar body portions 91. In this embodiment, the number of busbar body portions 91 is three. Only one of the busbar terminal portions 92 is connected to each busbar body portion 91. That is, the motor 10 is a three-phase motor, and each busbar 90 is a phase busbar connected to coils of one of three phases (i.e., a U phase, a V phase, and a W phase) and so on.

Referring to FIG. 1, at least a portion of each busbar body portion 91 is axially held between an upper busbar holder 62 and a lower busbar holder 63, which will be described below. At least a portion of each busbar body portion 91 is arranged to be in contact with both the upper and lower busbar holders 62 and 63. Each busbar 90 is thus held by the busbar holder 61.

The busbar terminal portion 92 is arranged to project upward from the busbar body portion 91. An upper end portion of the busbar terminal portion 92 is electrically connected to the control unit 70. The busbar unit 60 is thus electrically connected to the control unit 70. The busbar unit 60 is arranged on the upper side of the upper bearing holder 50. This makes it easier to connect the busbar unit 60 to the control unit 70 when assembling the motor 10 than in the case where the busbar unit 60 is arranged axially between the stator 40 and the upper bearing holder 50.

Referring to FIG. 4, the busbars 90 include at least three busbar terminal portions 92. The three busbar terminal portions 92 are arranged at regular intervals along the circumferential direction. That is, at least one of the busbar terminal portions 92 is arranged at each of three positions that divide the busbar holder 61 into three equal parts in the circumferential direction in a plan view.

Referring to FIGS. 1 and 4, each busbar terminal portion 92 is in the shape of a rectangular or substantially rectangular plate. Referring to FIG. 1, a lengthwise direction of the busbar terminal portion 92 is parallel to the axial direction. Referring to FIG. 4, a widthwise direction of the busbar terminal portion 92 is parallel to the radial direction.

Each coil connection portion 93 is connected to a corresponding one of the busbar body portions 91. The coil connection portion 93 is arranged radially inward of an inner edge of the upper busbar holder 62, which will be described below. The coil connection portion 93 is arranged radially outward of an inner edge of the lower busbar holder 63, which will be described below.

An external shape of the coil connection portion 93 is in the shape of the letter "U" with an open top facing radially outward in a plan view. Referring to FIG. 1, the coil connection portion 93 is arranged to hold the corresponding coil wire 94. Each coil wire 94 is connected to the corresponding coil connection portion 93 and the corresponding coil 43, passing through the corresponding holder through hole 52c and a corresponding one of a plurality of wire hole portions 63b, which will be described below. Each busbar 90 and the stator 40 are thus electrically connected to each other through the corresponding coil wires 94.

In the case where the upper bearing holder 50 is arranged axially between the busbar unit 60 and the stator 40 as described above, each coil wire 94 is passed through the corresponding holder through hole 52c of the upper bearing holder 50 to connect the stator 40 to the busbar unit 60. Therefore, if the upper bearing holder 50 is not radially positioned with sufficient accuracy relative to each of the stator 40 and the busbar unit 60, it may not be easy for the operator or the like to pass each coil wire 94 through the corresponding holder through hole 52c when assembling the motor 10. In addition, the coil wire 94 may become pressed against an edge of the corresponding holder through hole 52c to cause damage to the coil wire 94.

In contrast, in this embodiment, the upper bearing holder 50 is arranged to be in contact with the housing inner circumferential surface 21a. Accordingly, the upper bearing holder 50 is positioned with respect to the housing inner circumferential surface 21a, as each of the stator 40 and the busbar unit 60 is positioned with respect to the housing inner circumferential surface 21a. This allows the upper bearing holder 50 to be radially positioned with high accuracy with respect to each of the stator 40 and the busbar unit 60. As a result, the operator or the like can easily pass each coil wire 94 through the corresponding holder through hole 52c. In addition, the coil wire 94 can be prevented from being pressed against the edge of the corresponding holder through hole 52c, avoiding damage to the coil wire 94.

Referring to FIG. 1, the busbar holder 61 includes the upper and lower busbar holders 62 and 63. The busbar holder 61 is preferably made of a resin. The upper busbar holder 62 is arranged to axially overlap with the lower busbar holder 63. The upper busbar holder 62 is arranged on the upper side of the lower busbar holder 63.

Referring to FIGS. 1, 4, and 5, the upper busbar holder 62 includes an upper holder body portion 62a, an outer edge projecting portion 62b, a plurality of holder protruding portions 64, a fitting projecting portion 66, and terminal support portions 68. That is, the busbar holder 61 includes the upper holder body portion 62a, the outer edge projecting portion 62b, the holder protruding portions 64, the fitting projecting portion 66, and the terminal support portions 68.

Referring to FIG. 4, the upper holder body portion 62a is annular. The upper holder body portion 62a is in the shape of an annular ring, and is centered on the central axis J. Referring to FIGS. 1 and 5, the outer edge projecting portion 62b is tubular, and is arranged to project downward from a radially outer edge of the upper holder body portion 62a.

Referring to FIG. 4, each holder protruding portion 64 is arranged to project radially outward from the upper holder body portion 62a. A radially outer end portion of the holder protruding portion 64 is arranged to be in contact with the housing inner circumferential surface 21a. That is, the busbar unit 60 is arranged to be in contact with the housing inner circumferential surface 21a through the radially outer end portion of each holder protruding portion 64.

The radially outer end portion of each holder protruding portion 64 is a portion of a radially outer edge of the busbar holder 61. Molding the radially outer end portion of each holder protruding portion 64 with high accuracy is easier than molding the entire radially outer edge of the busbar holder 61 with high accuracy. Accordingly, an improvement is achieved in the accuracy with which a portion or portions of the busbar holder 61 which are arranged to be in contact with the housing inner circumferential surface 21a are molded, increasing the accuracy with which the busbar unit 60 is radially positioned with respect to the stator 40.

The upper busbar holder 62 includes the plurality of holder protruding portions 64. That is, the busbar holder 61 includes the plurality of holder protruding portions 64. In FIG. 4, the number of holder protruding portions 64 included in the busbar holder 61 is three. The holder protruding portions 64 are arranged at regular intervals along the circumferential direction. This leads to stable holding of the busbar holder 61 by the housing inner circumferential surface 21a.

The holder protruding portions 64 are arranged at the same circumferential positions as those of the busbar terminal portions 92. As described above, each holder protruding portion 64 is a portion arranged to be in contact with the housing inner circumferential surface 21a to radially position the busbar unit 60. Accordingly, the busbar holder 61 is radially positioned with higher accuracy with respect to the housing inner circumferential surface 21a at the circumferential position of each holder protruding portion 64 and its vicinity than at other circumferential positions.

Thus, arranging the holder protruding portions 64 at the same circumferential positions as those of the busbar terminal portions 92 contributes to improving the accuracy with which each busbar terminal portion 92 is radially positioned relative to the stator 40. This makes it easy for the operator or the like to connect each busbar terminal portion 92 to a wire or the like when assembling the motor 10. In this embodiment, each busbar terminal portion 92 is connected to the control unit 70. Thus, the busbar terminal portion 92 can be easily connected to the control unit 70.

A circumferential center of each holder protruding portion 64 coincides with a circumferential center of a corresponding one of the busbar terminal portions 92. This contributes to increasing the accuracy with which each busbar terminal portion 92 is radially positioned relative to the stator 40.

Note that when two objects are herein described as being arranged at the same circumferential position, the intended meaning is that at least portions of the two objects are arranged at the same circumferential position in a plan view, not only that circumferential centers of the two objects are arranged at the same circumferential position. That is, at least a portion of each holder protruding portion 64 may be arranged at the same circumferential position as that of at least a portion of the corresponding busbar terminal portion 92 in the plan view.

Referring to FIG. 3, the fitting projecting portion 66 is arranged to project downward from the upper holder body portion 62*a*. A lower holder body portion 63*a* includes a through hole 63*c* passing therethrough in the axial direction. The fitting projecting portion 66 is arranged to pass through the through hole 63*c* and project downward below the lower holder body portion 63*a*. Referring to FIG. 5, an external shape of the fitting projecting portion 66 is circular in a plan view.

Referring to FIG. 3, a lower end portion of the fitting projecting portion 66 is arranged in the fitting hole portion 52*b* of the upper bearing holder 50. The fitting projecting portion 66 is fitted into the fitting hole portion 52*b* of the upper bearing holder 50. The busbar holder 61 is accordingly positioned circumferentially and radially with respect to the upper bearing holder 50.

Referring to FIG. 1, each terminal support portion 68 is arranged to project upward from the upper holder body portion 62*a*. The terminal support portion 68 is arranged to cover a lower end portion and its vicinity of a corresponding one of the busbar terminal portions 92. The terminal support portion 68 is arranged to support the corresponding busbar terminal portion 92. The busbar terminal portion 92 is arranged to project upward from the upper end portion of the terminal support portion 68.

The number of terminal support portions 68 is equal to the number of busbar terminal portions 92. In this embodiment, the number of terminal support portions 68 included in the upper busbar holder 62 is three. The three terminal support portions 68 are arranged at regular intervals along the circumferential direction. That is, at least one of the terminal support portions 68 is arranged at each of the three positions that divide the busbar holder 61 into three equal parts in the circumferential direction in the plan view.

Referring to FIGS. 1, 4, and 5, the lower busbar holder 63 includes the lower holder body portion 63*a*, an inner edge projecting portion 63*d*, a plurality of abutment portions 65, and a plurality of weld portions 67. That is, the busbar holder 61 includes the lower holder body portion 63*a*, the inner edge projecting portion 63*d*, the plurality of abutment portions 65, and the plurality of weld portions 67.

Referring to FIG. 5, the lower holder body portion 63*a* is annular. The lower holder body portion 63*a* is in the shape of an annular ring, and is centered on the central axis J. Referring to FIG. 4, an inner edge of the lower holder body portion 63*a* is arranged radially inward of an inner edge of the upper holder body portion 62*a*. Referring to FIGS. 1 and 5, an outer edge of the lower holder body portion 63*a* is arranged radially inside of the outer edge projecting portion 62*b* of the upper busbar holder 62. The lower holder body portion 63*a* is fitted to an inside of the outer edge projecting portion 62*b*.

Referring to FIG. 1, the lower holder body portion 63*a* includes the wire hole portions 63*b* each of which is arranged to pass through the lower holder body portion 63*a* in the axial direction. Each wire hole portion 63*b* is arranged to have the corresponding coil wire 94 pass therethrough. Referring to FIGS. 4 and 5, the lower holder body portion 63*a* includes the plurality of wire hole portions 63*b*. The wire hole portions 63*b* are arranged along the circumferential direction. The wire hole portions 63*b* are arranged to axially overlap with the coil connection portions 93. Referring to FIG. 1, the wire hole portions 63*b* are arranged to axially overlap with the holder through holes 52*c*.

The upper and lower holder body portions 62*a* and 63*a* together define a holder body portion.

The inner edge projecting portion 63*d* is arranged to project upward from the inner edge of the lower holder body portion 63*a*. The inner edge projecting portion 63*d* is in the shape of a tube opening both upward and downward in the axial direction. The inner edge projecting portion 63*d* is cylindrical or substantially cylindrical and is centered on the central axis J. The upper end portion of the holding portion 51 is arranged inside of the inner edge projecting portion 63*d*. That is, at least a portion of the inner edge projecting portion 63*d* is arranged to radially overlap with the holding portion 51. This allows the busbar unit 60 and the upper bearing holder 50 to be arranged close to each other in the axial direction. This leads to a reduction in the axial dimension of the motor 10.

Each abutment portion 65 is arranged to project downward from the lower holder body portion 63*a*. Referring to FIG. 5, the abutment portions 65 are arranged at regular intervals along the circumferential direction. In this embodiment, the number of abutment portions 65 included in the lower busbar holder 63 is three. An external shape of each abutment portion 65 is circular in a plan view. Note that the external shape of each abutment portion 65 may alternatively be another shape in the plan view.

An abutment portion lower surface 65*a* is a lower surface of the abutment portion 65. The annular portion upper surface 52*a* is the upper surface of the upper bearing holder 50. Referring to FIG. 1, the abutment portion lower surface 65*a* is arranged to be in contact with the annular portion upper surface 52*a*. The busbar unit 60 is accordingly axially positioned with respect to the upper bearing holder 50. The abutment portions 65 are arranged at regular intervals along the circumferential direction. This contributes to increasing parallelism of the busbar unit 60 with the upper bearing holder 50.

Referring to FIG. 5, the abutment portions 65 are arranged at the same circumferential positions as those of the holder protruding portions 64. The holder protruding portions 64 are arranged at the same circumferential positions as those of the busbar terminal portions 92. Accordingly, the abutment portions 65 are arranged at the same circumferential positions as those of the busbar terminal portions 92.

The busbar holder 61 is axially positioned with higher accuracy with respect to the upper bearing holder 50 at the circumferential position of each abutment portion 65 and its vicinity than at other circumferential positions. Thus, arranging the busbar terminal portions 92 at the same circumferential positions as those of the abutment portions 65 contributes to improving the accuracy with which each busbar terminal portion 92 is axially positioned with respect to the upper bearing holder 50. This makes it easier to connect each busbar terminal portion 92 to the control unit 70.

Referring to FIG. 1, each abutment portion 65 is arranged to axially overlap with a corresponding one of the busbar terminal portions 92. In other words, each busbar terminal portion 92 is arranged directly above a corresponding one of the abutment portions 65. Each abutment portion 65 is arranged to axially position the busbar unit 60 with respect to the upper bearing holder 50. Accordingly, each busbar terminal portion 92 is axially positioned with respect to the upper bearing holder 50 with increased accuracy.

Referring to FIG. 4, the weld portions 67 are arranged along the circumferential direction. Although not shown in the figures, each weld portion 67 is arranged to project upward from the lower holder body portion 63a. The weld portion 67 is arranged to pass through a through hole (not shown) defined in the upper holder body portion 62a, and project upward above the upper holder body portion 62a. An upper end portion of the weld portion 67 is welded onto an upper surface of the upper holder body portion 62a. The upper holder body portion 62a is thus fixed to the lower holder body portion 63a.

The shape of the busbar holder 61 is arranged to have rotational symmetry about the central axis J. If the shape of the busbar holder 61 did not have the rotational symmetry, the amount of the resin which flows in a mold would vary at different circumferential positions when the busbar holder 61 is produced by a resin molding process. As a result, the resin would be cured at different times at different circumferential positions, and the accuracy with which the busbar holder 61 is molded would vary at different circumferential positions. Accordingly, dimensional accuracy of the busbar holder 61 might be reduced.

In contrast, in this embodiment, the shape of the busbar holder 61 is arranged to have rotational symmetry about the central axis J. This allows the amount of the resin to be substantially uniform in the circumferential direction when the busbar holder 61 is molded. Thus, a reduction in the accuracy with which the busbar holder 61 is molded can be reduced or prevented. This leads to an increase in the accuracy with which the busbar holder 61 is molded, increasing the accuracy with which the busbar unit 60 is radially positioned relative to the stator 40. In addition, the accuracy with which the busbar unit 60 is axially positioned relative to the upper bearing holder 50 can be increased.

As described above, at least one of the busbar terminal portions 92 is arranged at each of the three positions that divide the busbar holder 61 into three equal parts in the circumferential direction in the plan view. The plurality of terminal support portions 68 are arranged to support the busbar terminal portions 92. Thus, the plurality of terminal support portions 68 can be arranged to have rotational symmetry about the central axis J. This allows the shape of the busbar holder 61 to have rotational symmetry about the central axis J.

Note that when a given object is herein described as being arranged to have rotational symmetry about the central axis J, the intended meaning is that the shape of the given object is arranged to have exact or approximate rotational symmetry about the central axis J. That is, at least the holder protruding portions 64 or the terminal support portions 68 are arranged to have rotational symmetry about the central axis J.

Referring to FIG. 1, the control unit 70 is arranged on the upper side of the busbar unit 60. The control unit 70 is, for example, an engine control unit (ECU). The control unit 70 is electrically connected to the busbar unit 60 through the busbar terminal portions 92. The control unit 70 is arranged to be in contact with the housing inner circumferential surface 21a. Accordingly, both the control unit 70 and the busbar unit 60 are positioned with respect to the housing inner circumferential surface 21a. Thus, the accuracy with which the control unit 70 is radially positioned relative to the busbar unit 60 can be improved. This makes it easy to connect the busbar unit 60 and the control unit 70 with each other.

Power is supplied to the control unit 70 through the connector portion 25. Although not shown in the figures, the control unit 70 includes, for example, a rotation sensor and an inverter circuit. The rotation sensor is arranged axially opposite to the sensor magnet 71. The rotation sensor is arranged to detect, for example, a rotational position or a rotational rate of the rotor 30. The inverter circuit is arranged to control electric currents to be supplied to the stator 40 based on, for example, the rotational position or the rotation rate of the rotor 30 detected by the rotation sensor. The rotation sensor may be, for example, a magnetoresistive element or a Hall element.

Note that the fitting hole portion 52b may not pass through the upper bearing holder 50 in the axial direction. In this case, the fitting hole portion 52b is a hole having a bottom and recessed downward from the annular portion upper surface 52a.

Note that the shape of each holder through hole 52c is not limited to any shape mentioned above. The through hole dimension L2 may be locally reduced at a point between the radially inner end portion and the radially outer end portion of the holder through hole 52c. In this case, the intermediate portion dimension L1 is locally increased at the radial position of the point at which the through hole dimension L2 is locally reduced.

Note that the through hole dimension L2 may be arranged to be substantially uniform throughout the entire radial extent of the holder through hole 52c. Also note that the intermediate portion dimension L1 may be arranged to increase from the radially inner end portion toward a radially outer end portion of the intermediate portion 52d.

Also note that the buffer portion 55 may be a groove recessed upward. Also note that the buffer portion 55 may be, for example, a portion at which an elastic member is arranged. In this case, the elastic member may be buried in the upper bearing holder 50, or may be arranged in the buffer portion 55 defined by the groove as illustrated in FIG. 3.

In FIG. 1, the busbar holder 61 includes two separate members, the upper and lower busbar holders 62 and 63. Note, however, that the busbar holder 61 may alternatively be defined by a single monolithic member.

Also note that the busbar holder 61 may include no holder protruding portion 64. In this case, the entire radially outer edge of the busbar holder 61 is arranged to be in contact with the housing inner circumferential surface 21a.

The busbars 90 may include at least three busbar terminal portions 92. That is, the busbars 90 may include four or more busbar terminal portions 92.

At least one of the busbar terminal portions 92 may be arranged at each of the three positions that divide the busbar holder 61 into three equal parts in the circumferential direction in the plan view. That is, two or more of the busbar terminal portions 92 may be arranged at any of the three positions that divide the busbar holder 61 into three equal parts in the circumferential direction in the plan view. In the case where four or more of the busbar terminal portions 92 are provided, one of the busbar terminal portions 92 is arranged at each of the three positions that divide the busbar holder 61 into three equal parts in the circumferential direction in the plan view, and the other busbar terminal portion(s) 92 may be arranged at any position(s).

Also note that busbar body portions 91 may alternatively be arranged at mutually different axial positions. In this case, the busbar body portions 91 are arranged to axially overlap with one another, for example.

Also note that the housing 20 may not be made of a metal, but may alternatively be made of, for example, a resin.

The rotor magnet 33 is directly or indirectly fixed to the shaft 31. That is, the rotor magnet 33 may alternatively be directly fixed to the shaft 31.

Also note that the motor 10 may alternatively not include the control unit 70.

Features of the above-described embodiments and the modifications thereof may be combined appropriately as long as no conflict arises.

While embodiments of the present invention have been described above, it is to be understood that variations and modifications will be apparent to those skilled in the art without departing from the scope and spirit of the present invention. The scope of the present invention, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a rotor comprising a shaft having a central axis as a center thereof;
a stator arranged radially outside of the rotor;
a bearing arranged on an upper side of the stator and structured to rotatably support the shaft;
a tubular housing arranged to hold the stator;
a bearing holder arranged on the upper side of the stator and structured to hold the bearing; and
a busbar unit arranged on an upper side of the bearing holder and structured to supply an electric drive current to the stator;
wherein the rotor comprises a rotor magnet directly or indirectly fixed to the shaft;
the stator comprises:
an annular core back;
teeth arranged to extend radially inward from the core back; and
coils wound around the teeth;
the housing comprises a housing tubular portion;
the housing tubular portion comprises a housing inner circumferential surface arranged to hold the stator;
the bearing holder is arranged to be in contact with the housing inner circumferential surface; and
the busbar unit is arranged to be in contact with the housing inner circumferential surface;
wherein the busbar unit comprises:
at least one busbar electrically connected to the stator; and
a busbar holder arranged to hold the at least one busbar;
the busbar holder comprises:
a holder body portion; and
a plurality of abutment portions each of which is arranged to project downward from the holder body portion;
the plurality of abutment portions are arranged at regular intervals along a circumferential direction; and
a lower surface of each abutment portion is arranged to be in contact with an upper surface of the bearing holder, and
wherein a gap is defined between the holder body portion and the bearing holder.

2. The motor according to claim 1, wherein the housing is made of a metal.

3. The motor according to claim 1, further comprising a control unit arranged on an upper side of the busbar unit, wherein the control unit is electrically connected to the busbar unit, and is arranged to be in contact with the housing inner circumferential surface.

4. The motor according to claim 1, wherein
the busbar holder further comprises:
at least one holder protruding portion arranged to project radially outward from the holder body portion; and
the busbar holder is arranged to be in contact with the housing inner circumferential surface through a radially outer end portion of each of the at least one holder protruding portion.

5. The motor according to claim 4, wherein
the at least one holder protruding portion comprises a plurality of holder protruding portions; and
the plurality of holder protruding portions are arranged at regular intervals along a circumferential direction.

6. The motor according to claim 4, wherein
each of the at least one busbar comprises:
a busbar body portion; and
a busbar terminal portion arranged to project upward from the busbar body portion; and
the at least one holder protruding portion is arranged at a same circumferential position as that of a corresponding busbar terminal portion.

7. The motor according to claim 6, wherein
the at least one busbar comprises at least three of the busbar terminal portions; and
at least one of the busbar terminal portions is arranged at each of three positions that divide the busbar holder into three equal parts in a circumferential direction in a plan view.

8. The motor according to claim 1, wherein
each of the at least one busbar comprises:
a busbar body portion; and
a busbar terminal portion arranged to project upward from the busbar body portion; and
each abutment portion is arranged at a same circumferential position as that of the corresponding busbar terminal portion.

9. The motor according to claim 1, wherein
the busbar holder further comprises:
a fitting projecting portion arranged to project downward from the holder body portion; and
the upper surface of the bearing holder includes a fitting hole portion into which the fitting projecting portion is fitted.

10. The motor according to claim 1, wherein
the bearing holder comprises a buffer portion arranged to extend in a circumferential direction to surround the bearing, and arranged to absorb a stress exerted on the bearing; and
the buffer portion comprises a groove recessed in an axial direction.

11. The motor according to claim 1, wherein
the bearing holder comprises:
a plurality of holder through holes arranged along a circumferential direction, each holder through hole being arranged to have a coil wire arranged to electrically connect a corresponding one of the coils to the busbar unit pass therethrough;
an intermediate portion defined circumferentially between circumferentially adjacent ones of the holder through holes;

each holder through hole is arranged to pass through the bearing holder in an axial direction, and is arranged to extend in a radial direction; and a circumferential dimension of the intermediate portion decreases when moving from a radially inner end of the intermediate portion to a radially outer end of the intermediate portion.

12. The motor according to claim 11, wherein a circumferential dimension of each holder through hole is greater at a radially outer end portion of the holder through hole than at a radially inner end portion of the holder through hole, and is smallest at the radially inner end portion of the holder through hole.

* * * * *